(12) United States Patent
Chen

(10) Patent No.: US 7,090,377 B2
(45) Date of Patent: Aug. 15, 2006

(54) STRIP LIGHT

(76) Inventor: Kuo-Pin Chen, No. 24, Alley 21, Lane 279, Jhong jheng Rd. Tainan County, Yongkang City (TW)

( * ) Notice: Subject to any disclaimer, the term of this patent is extended or adjusted under 35 U.S.C. 154(b) by 63 days.

(21) Appl. No.: 10/850,482

(22) Filed: May 20, 2004

(65) Prior Publication Data

US 2005/0259417 A1    Nov. 24, 2005

(51) Int. Cl.
*F21V 21/00* (2006.01)
*F21V 9/00* (2006.01)

(52) U.S. Cl. .................. 362/249; 362/230; 362/239
(58) Field of Classification Search ................ 362/249, 362/230, 239, 252, 235–237
See application file for complete search history.

(56) References Cited

U.S. PATENT DOCUMENTS

| | | | | |
|---|---|---|---|---|
| 5,931,577 A * | 8/1999 | Ishibashi | ...................... | 362/249 |
| 6,244,736 B1 * | 6/2001 | O'Neal | ...................... | 362/549 |
| 6,352,355 B1 * | 3/2002 | Law | ...................... | 362/253 |
| 6,533,441 B1 * | 3/2003 | Kisiel | ...................... | 362/470 |
| 6,682,205 B1 * | 1/2004 | Lin | ...................... | 362/249 |
| 2002/0149933 A1 * | 10/2002 | Archer et al. | ............... | 362/234 |
| 2004/0012956 A1 * | 1/2004 | Chen | ......................... | 362/240 |
| 2005/0231947 A1 * | 10/2005 | Sloan et al. | ................ | 362/235 |

\* cited by examiner

*Primary Examiner*—Renee Luebke
*Assistant Examiner*—Evan Dzierzynski
(74) *Attorney, Agent, or Firm*—Alan D. Kamrath; Nikolai & Mersereau, P.A.

(57) ABSTRACT

A strip light includes one or more light assemblies each having a transparent, flexible, and elongated member including a plurality of enclosures with LEDs enclosed therein. A base having a plurality of enlargements is fitted in bottoms of the enclosures. A wire is electrically coupled to terminals of the LEDs. A connecting member is formed at both ends of the elongated member, with each connecting member having two opposite recesses on its surface. In assembly, one connecting member of a first light assembly is cut. The other connecting member of a second light assembly is pressed onto the enclosure of the first light assembly adjacent the cut connecting member until the recesses of the other connecting member of the second light assembly are seated on the connecting elements of the first light assembly. Then, the first and second light assemblies are electrically coupled together.

7 Claims, 9 Drawing Sheets

STRIP LIGHT

BACKGROUND OF THE INVENTION

1. Field of the Invention

The present invention relates to LEDs (light-emitting diodes) and, more particularly, to a light assembly comprising a plurality of LEDs, with the light assembly adapted to couple to one or more light assemblies to form a strip light to be secured to an object (e.g., an automobile or a motorcycle) such as for warning and/or for other purposes (e.g., decoration).

2. Description of Related Art

LEDs are employed in many applications including indicators. However, continuing improvements in the exploitation of LEDs are constantly being sought.

SUMMARY OF THE INVENTION

It is an object of the present invention to provide a strip light including one or more light assemblies each comprising a transparent, flexible, and elongated member including a plurality of hollow, cylindrical enclosures. Adjacent enclosures are coupled together by an integral connecting element. Each enclosure has an internal space and an annular top flange. A plurality of LEDs are disposed in the internal spaces. An elongated base is provided having a plurality of enlargements each fitted in a bottom of the enclosure. Both terminals of each of the LEDs are fastened in the enlargement. A wire is electrically coupled to the terminals of the LEDs, with the wire having a plug at one end and a jack at the other end. A hollow, cylindrical connecting member is formed at both ends of the elongated member, with each connecting member having a pair of opposite recesses on its surface. In assembling a first light assembly with a second light assembly, one connecting member of the first light assembly is cut, and the other connecting member of the second light assembly is pressed onto the enclosure of the first light assembly adjacent the cut connecting member until the recesses of the other connecting member of the second light assembly are seated on the connecting element of the first light assembly. The plug of the first light assembly is inserted into the jack of the second light assembly.

In one aspect of the present invention, there is further provided a positioning member having an opening. The positioning member is pressed onto the enclosure by passing the flange of the light assembly through the opening of the positioning member. A plurality of fasteners are driven through positioning members on opposite sides of the light assembly and into an object for fastening.

The above and other objects, features and advantages of the present invention will become apparent from the following detailed description taken with the accompanying drawings.

BRIEF DESCRIPTION OF THE DRAWINGS

FIG. 7A is an enlarged view showing the encircled area labeled I in FIG. 7; and FIG. 7B is an enlarged view showing the encircled area labeled II in FIG. 7.

DETAILED DESCRIPTION OF THE PREFERRED EMBODIMENTS

Figure 1:
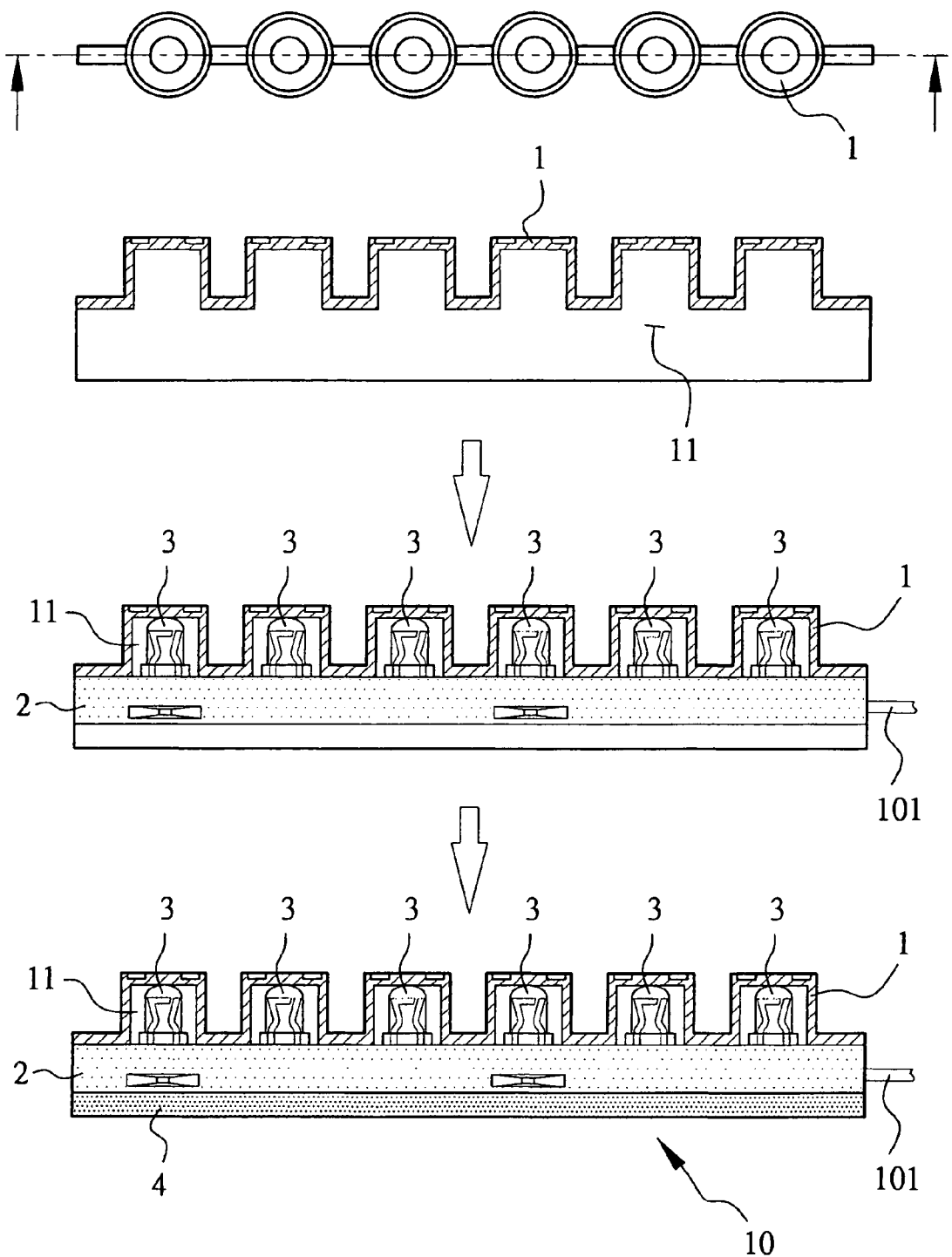
FIG. 1 schematically shows steps of assembling parts of a light assembly together according to the invention.
Figure 2:
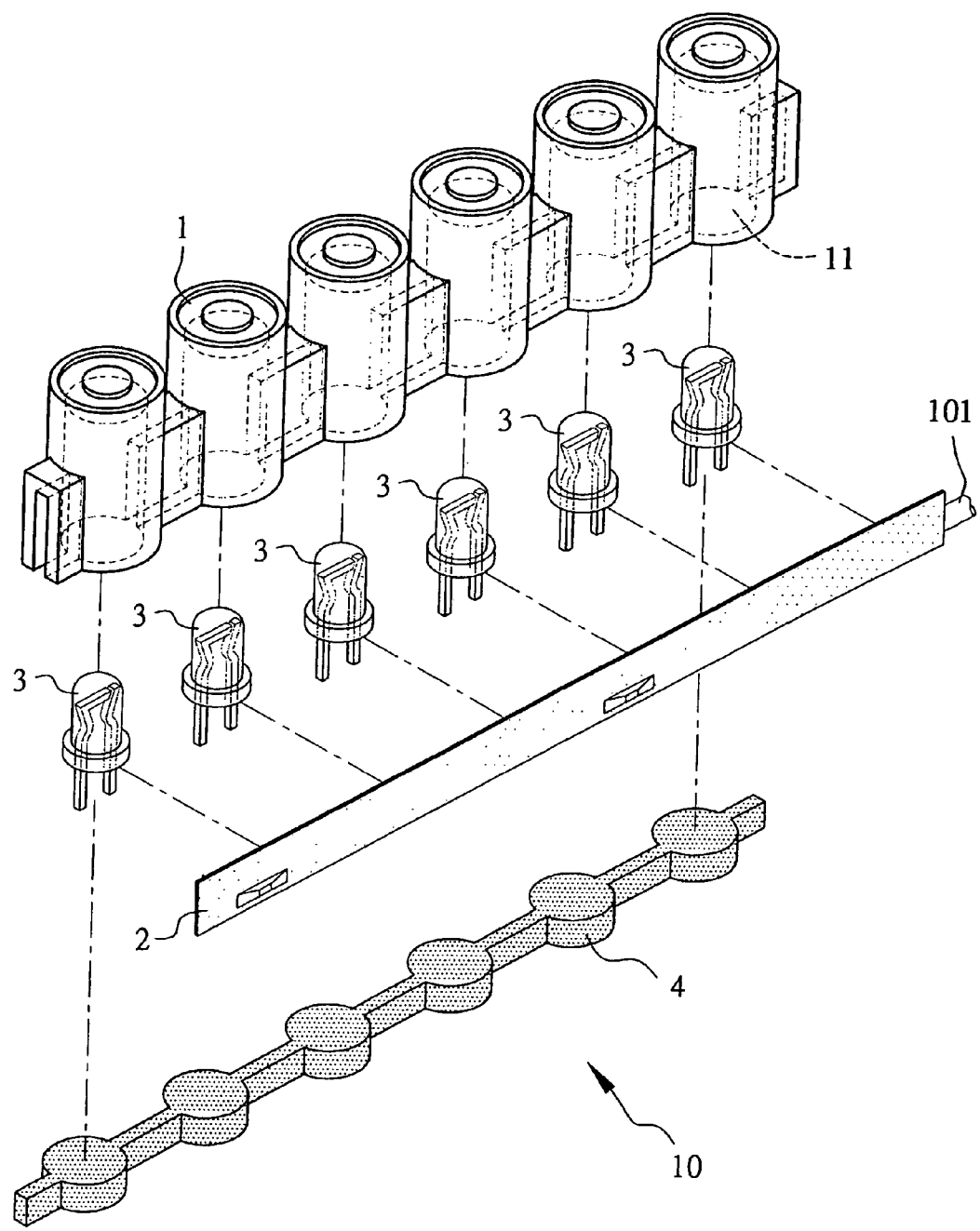
FIG. 2 is an exploded view of the assembled light assembly of FIG. 1.
Figure 3:
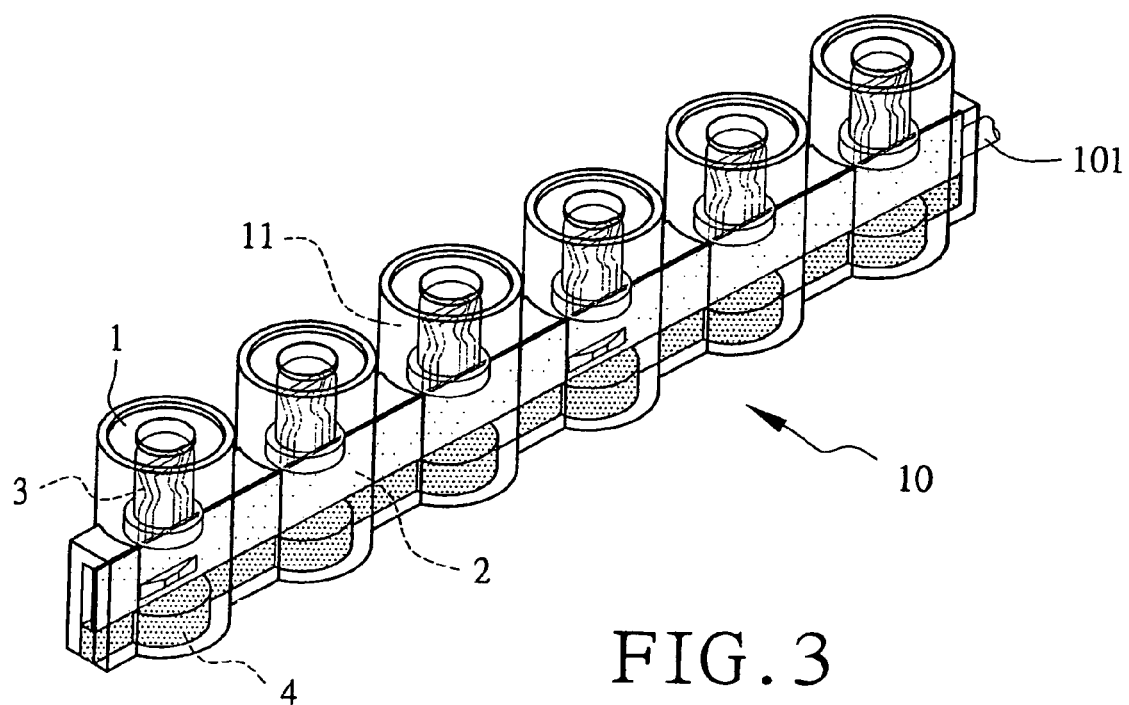
FIG. 3 is a schematic perspective view of the assembled light assembly of FIG. 1.
Figure 4:
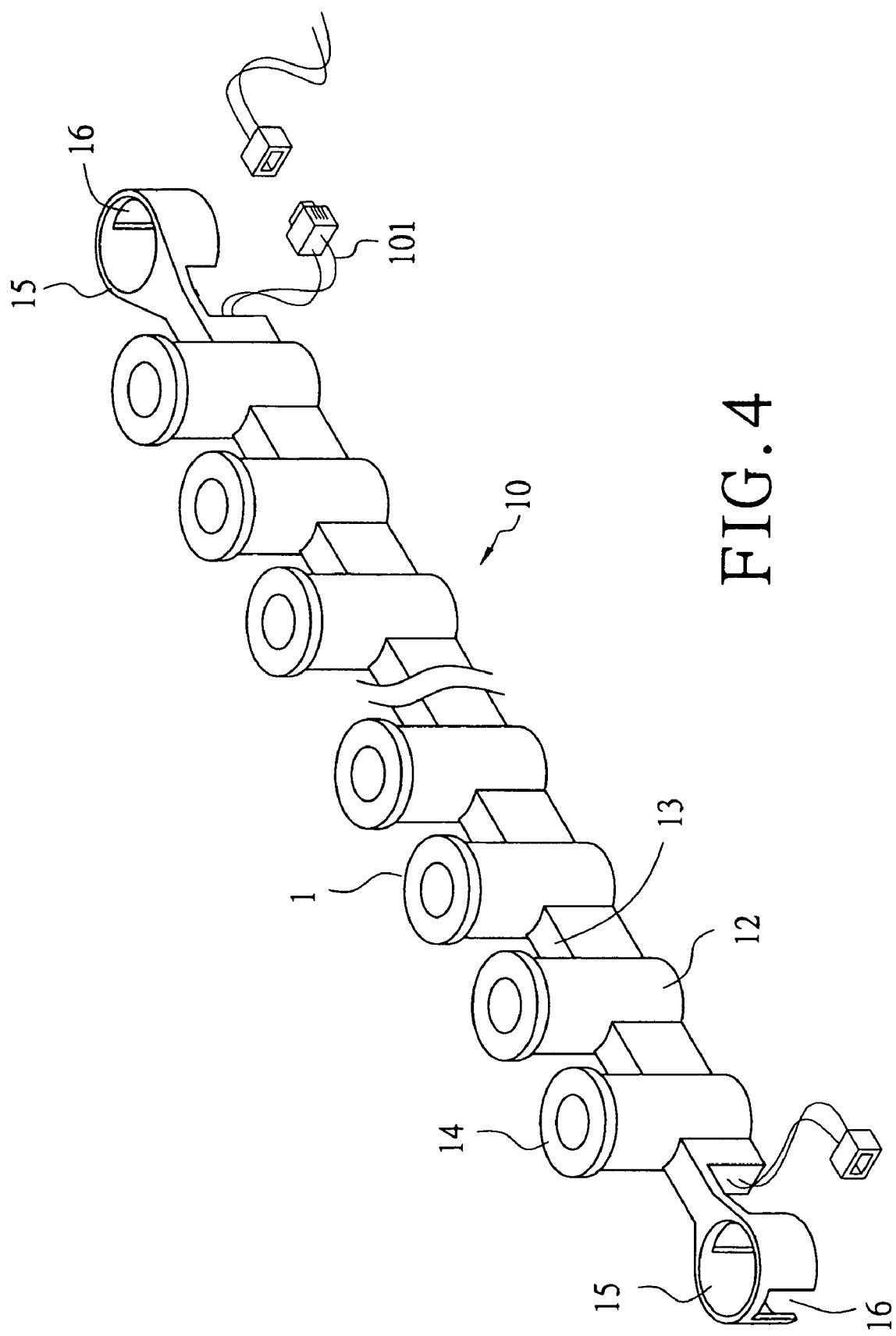
FIG. 4 is a perspective view of a complete light assembly of the invention with connecting members formed at both ends and plug and jack coupled to both ends of a wire.
Figure 5:
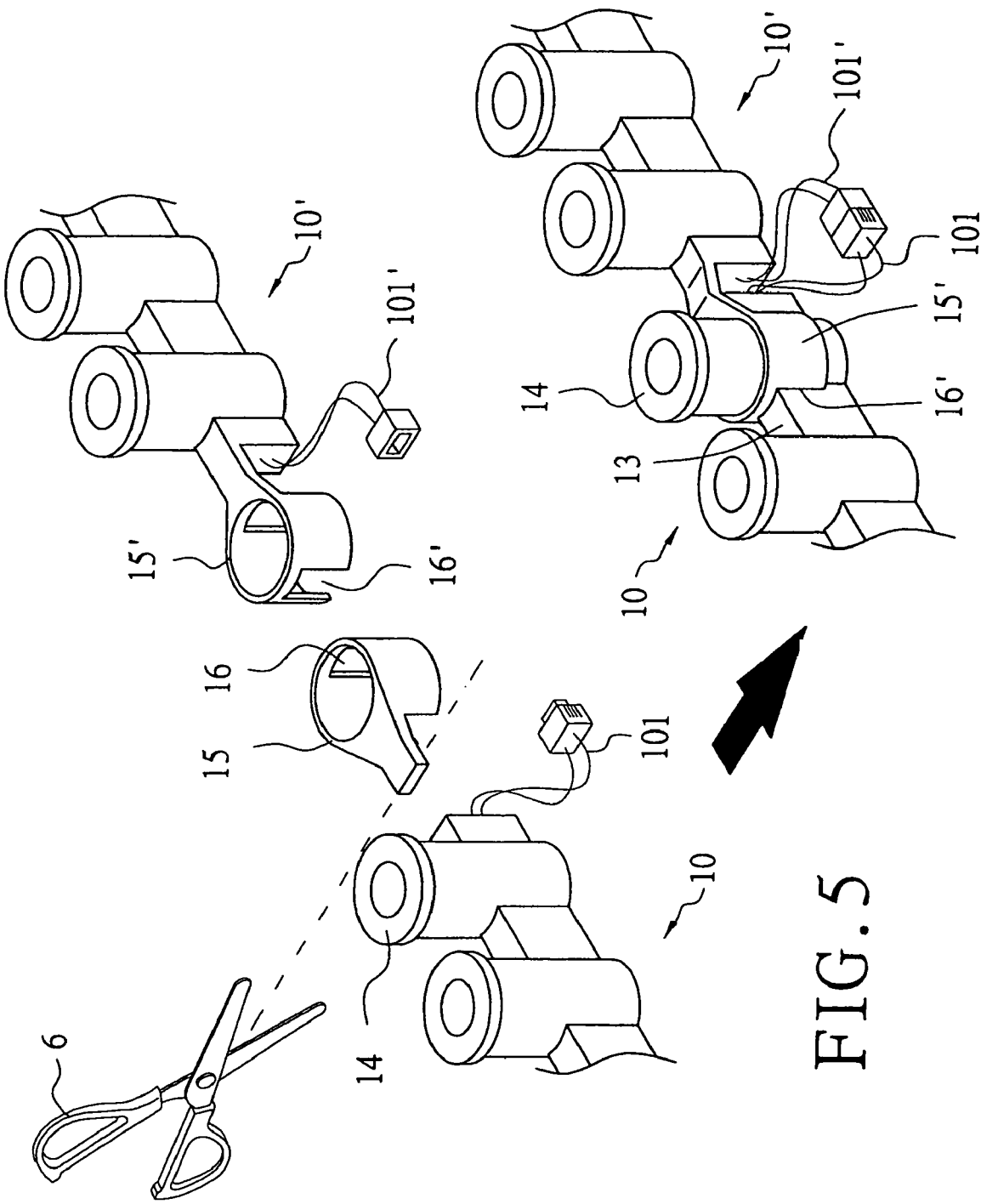
FIG. 5 is a perspective view showing steps of assembling two light assemblies together as a unit or a portion of a unit.
Figure 6:
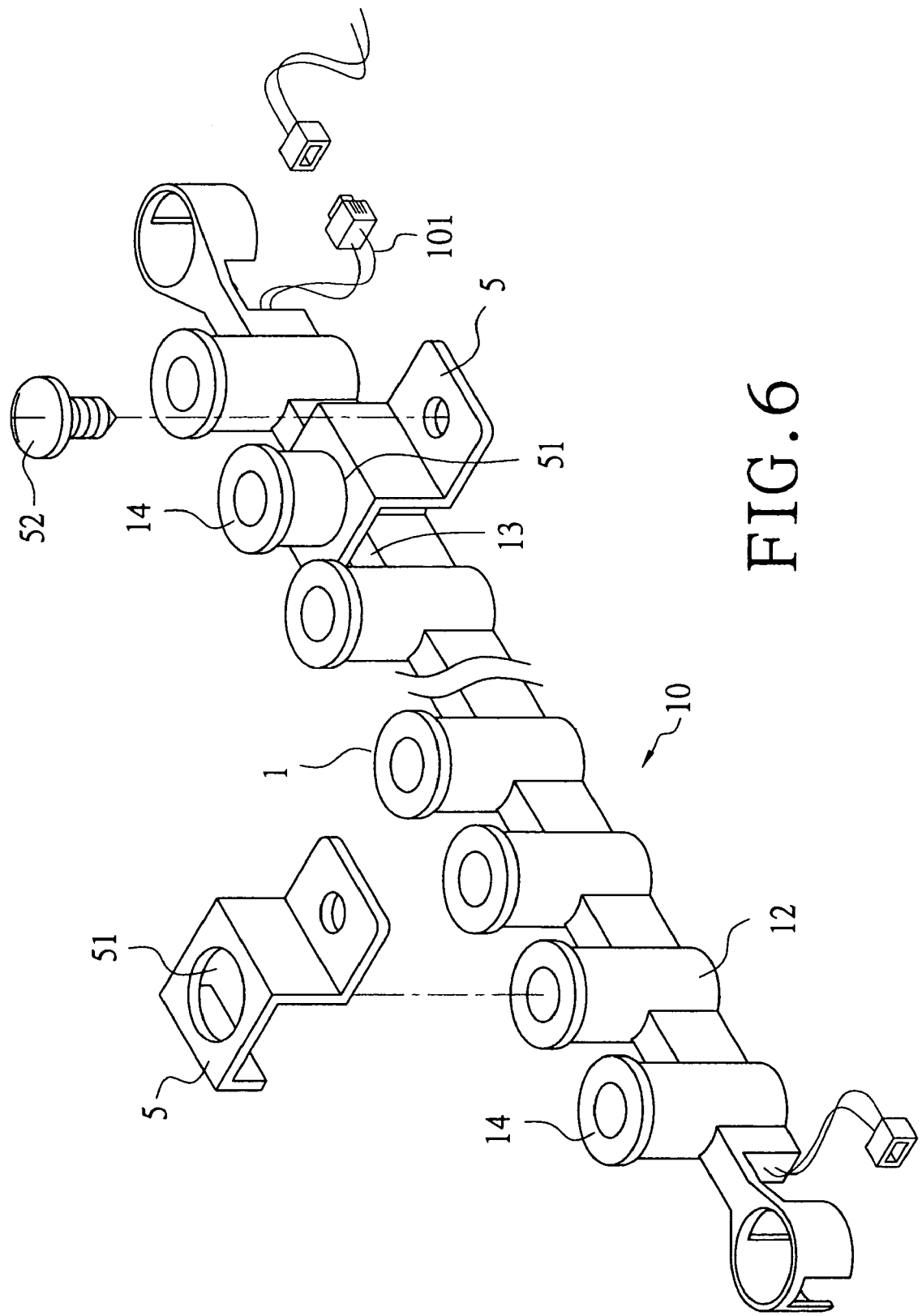
FIG. 6 is a perspective view of the assembled strip light to be fastened at an object by fasteners.

Referring to FIGS. 1 to 6, a strip light constructed in accordance with the invention is illustrated. The strip light comprises one or more light assemblies 10 each comprising a transparent, flexible, and elongate member 1 including a plurality of hollow, cylindrical enclosures 12. Adjacent enclosures 12 are coupled together by an integral connecting element 13. Each enclosure 12 has an internal space 11 and an annular top flange 14. Each of a plurality of LEDs 3 is disposed in the internal space 11. An elongated base 4 is formed of silicone having waterproof and increased heat dissipation properties. The base 4 has a plurality of enlargements each snugly fitted in a bottom of the enclosure 12. Both terminals of the LEDs 3 are fastened in the enlargement. A strip 2 having a lengthwise wire 101 is electrically coupled to the terminals of the LEDs 3. Also, a hollow, cylindrical connecting member 15 is formed at both ends of the light assembly 10. The connecting member 15 has a pair of opposite recesses 16 on its surface.

In assembly (see FIG. 5), one connecting member 15 of a light assembly 10 is cut off. Next, the other connecting member 15' of another light assembly 10' is pressed onto the enclosure 12 adjacent the cut connecting member 15 until the recesses 16' of the other connecting member 15' of another light assembly 10' are seated on the connecting elements 13. A plug of wire 101 of the light assembly 10 is inserted into a jack of wire 101' of another light assembly 10'. This procedure may be repeated one or more times until a strip light having a desired length is formed. Note that this procedure is optional and is only applicable to a strip light including a plurality of light assemblies 10.

In a case of the strip light having a single light assembly (see FIG. 6), each of two positioning members 5 are pressed down onto the enclosure 12 until two wings of the positioning members 5 are seated upon an object after the flange 14 passes an opening 51 of the positioning members 5. Screws 52 are driven through the side holes of the positioning members 5 into an object so as to secure the positioning members 5 to the object.

Figure 7:
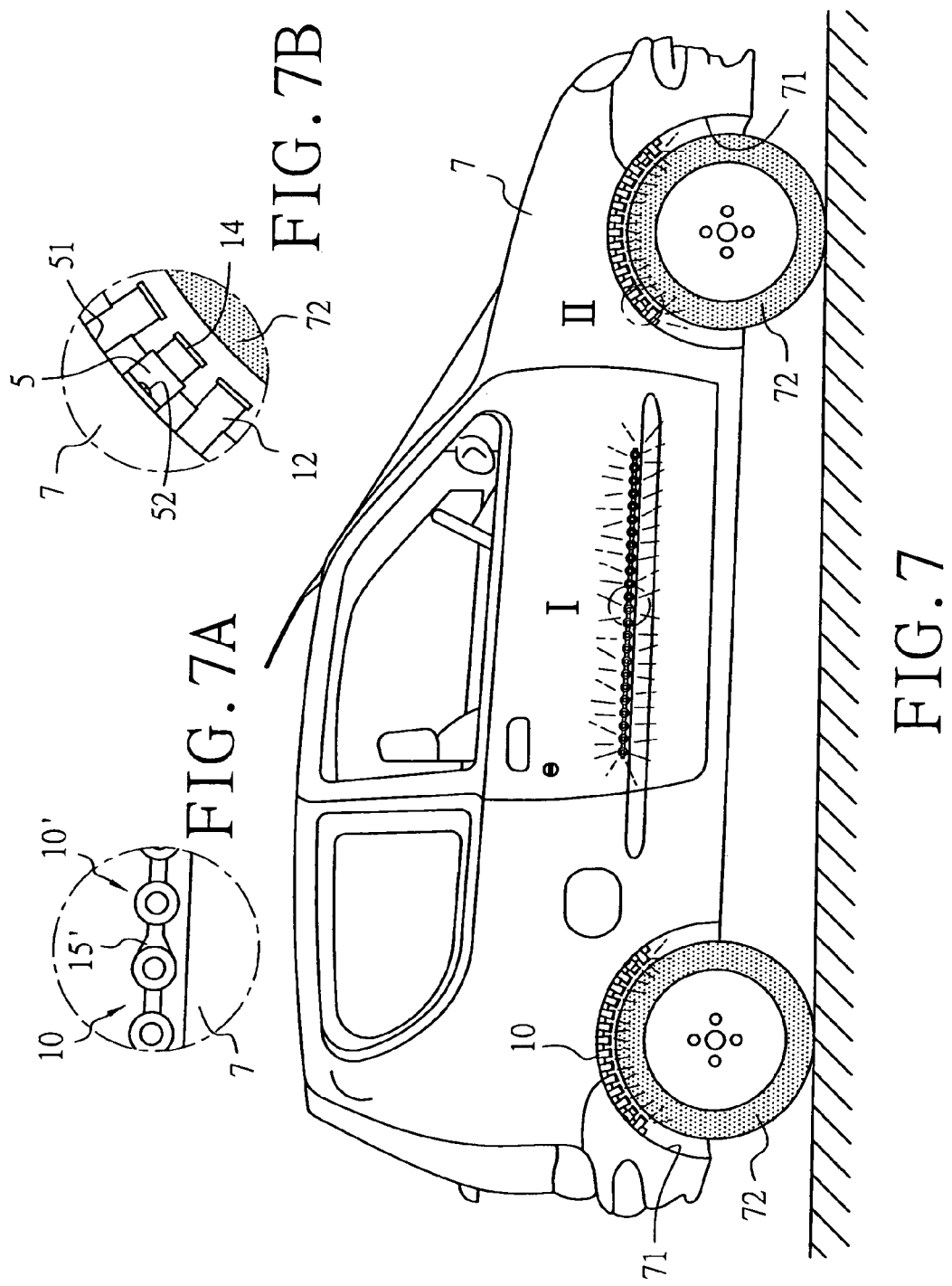
FIGS. 7 to 10 are perspective views showing the strip light of the invention mounted in four applications.

Referring to FIG. 7, there is shown a first application of the strip light of the invention. One strip light is adhered to a door of an automobile 7 by applying strong adhesive thereto (see FIG. 7A), and two strip lights are secured to fenders 71 facing wheels 72 thereof by a plurality of positioning members 5 (see FIG. 7B).

Figure 8:
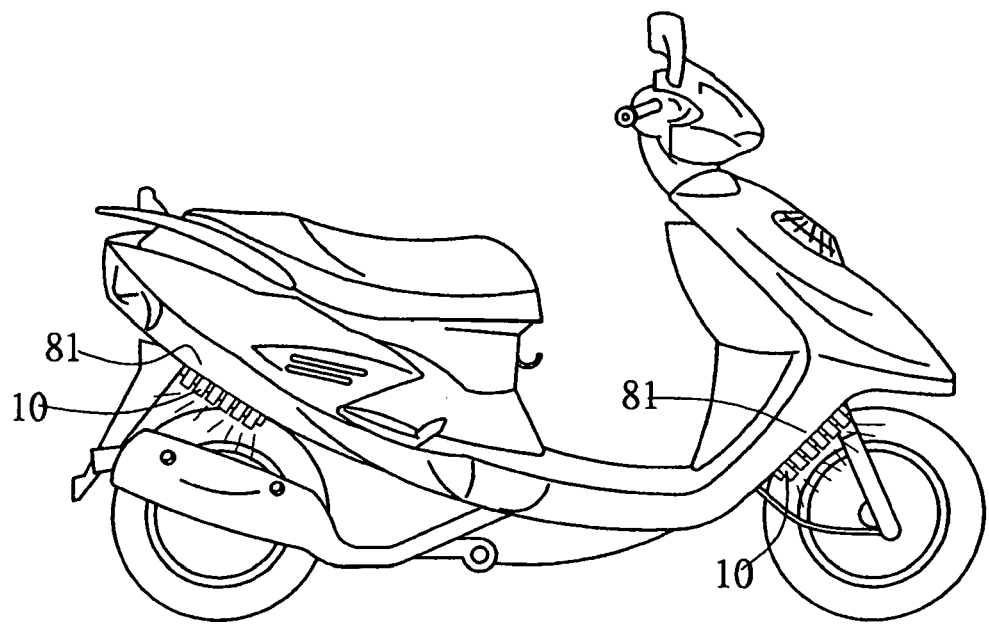

Referring to FIG. 8, there is shown a second application of the strip light of the invention. Two strip lights are secured to fenders 81 of a motorcycle by one or more positioning members 5.

Figure 9:
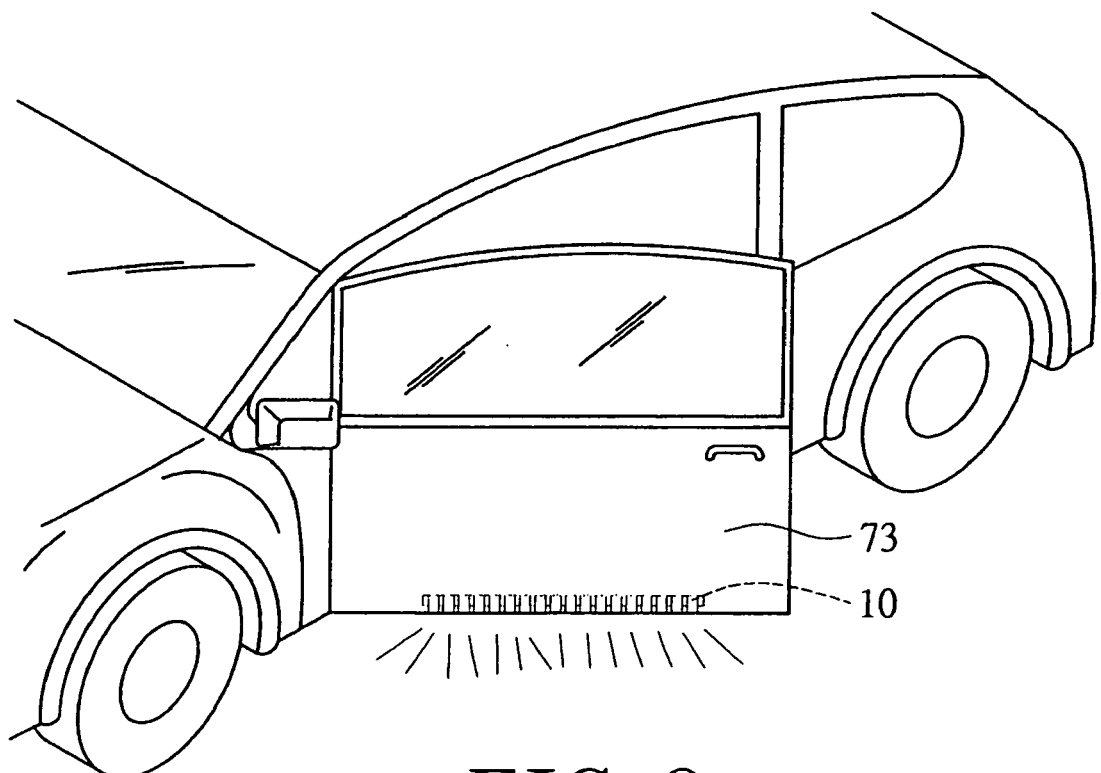

Referring to FIG. 9, there is shown a third application of the strip light of the invention. One strip light is adhered to a bottom edge of a door 73 of an automobile by applying strong adhesive thereto.

Figure 10:
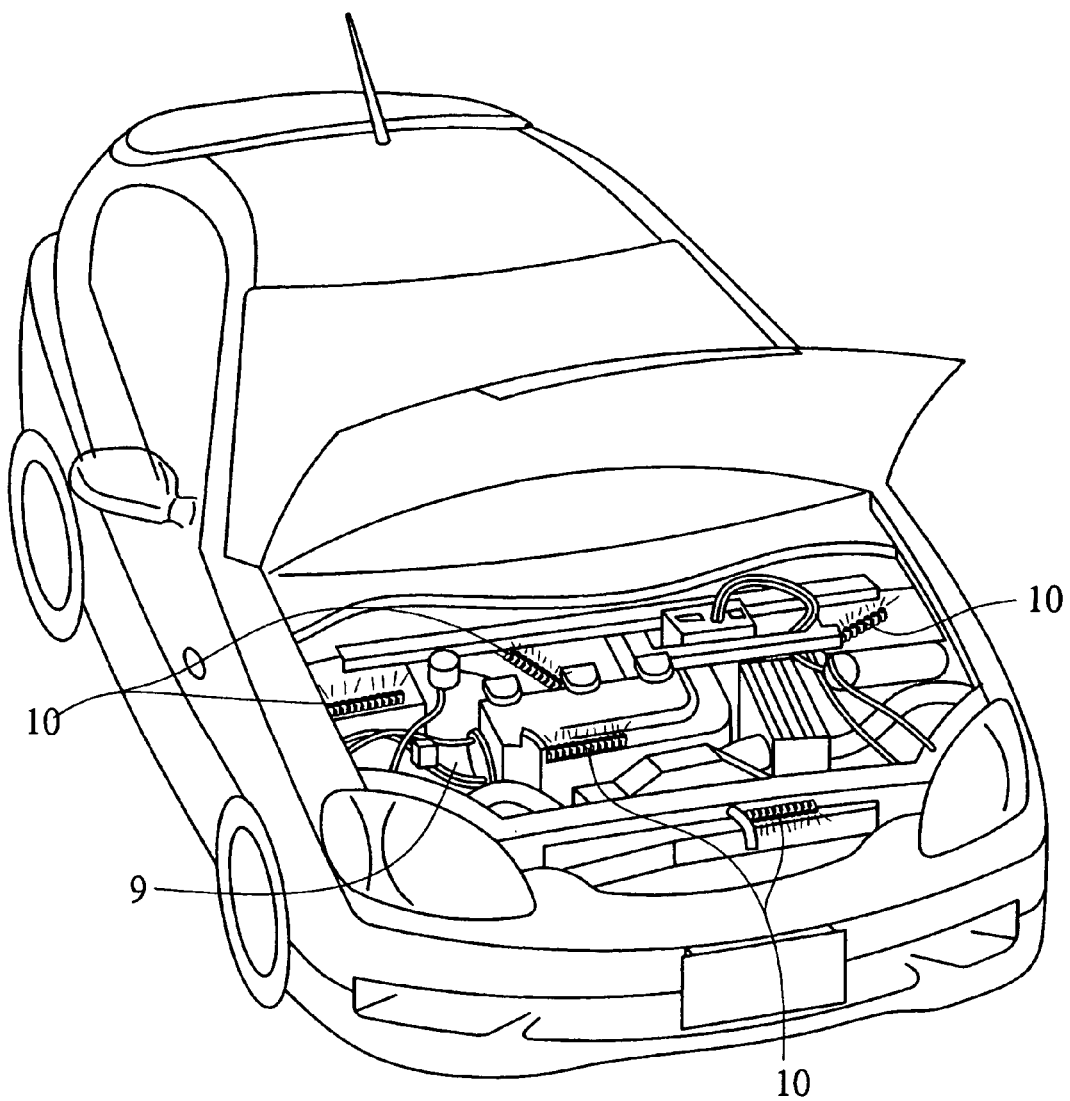

Referring to FIG. 10, there is shown a fourth application of the strip light of the invention. A plurality of strip lights are secured to a number of different parts of engine 9 of an automobile by a plurality of short ropes.

Note that each of the strip lights is electrically coupled to a battery of the automobile or motorcycle by which the strip light can be energized for causing the LEDs 3 to emit light through the transparent elongate member 1.

While the invention herein disclosed has been described by means of specific embodiments, numerous modifications and variations could be made thereto by those skilled in the art without departing from the scope and spirit of the invention set forth in the claims.

What is claimed is:

1. A light assembly comprising:
    a transparent, flexible, and elongated member including a plurality of hollow, cylindrical enclosures, wherein adjacent enclosures are coupled together by an integral connecting element and each enclosure has an internal space and an annular top flange;
    a plurality of LEDs, with each of the plurality of LEDs disposed in the internal space of one of the enclosures;
    an elongated base having a plurality of enlargements each fitted in a bottom of the enclosure wherein both terminals of each of the LEDs are fastened in the enlargement;
    a wire electrically coupled to the terminals of the LEDs, the wire having a plug at one end and a jack at the other end; and
    first and second hollow, cylindrical connecting members formed at first and second ends of the elongated member, with the first and second connecting members each having a pair of opposite recesses on its surface;
    wherein each of the first and second connecting members of the light assembly is capable of being cut to allow the other connecting member of another light assembly to be pressed onto the enclosure of the light assembly adjacent the end of the elongated member from which the connecting member was cut.

2. The light assembly of claim 1, further comprising a positioning member having a continuous opening smaller than the annular top flange, and wherein the positioning member is pressed onto the enclosure by stretching the continous opening of the positioning member over the annular top flange, and a fastener driven through the positioning member into an object for fastening.

3. The light assembly of claim 1, wherein the base is formed of silicone.

4. The light assembly of claim 1, wherein each of the enclosures has circular cross-sections and each of the integral connecting elements has cross sections of a right parallelepiped shape extending along a direction between the adjacent enclosures, with a width of the connecting element perpendicular to the length being less than a diameter of the circular cross-sections of the enclosures, with each integral connecting element having a bottom, with the bottoms of the enclosures and integral connecting elements of the elongated member defining a continuous opening of a length corresponding to the plurality of enclosures and the integral connecting elements and extending perpendicular to axes of the circular cross-sections of the plurality of enclosures, with the base having a size and shape for slideable and sealing receipt inside of the continuous opening of the elongated member, with the plurality of enlargements having cross sections corresponding to and for slideable receipt within the circular cross sections of the enclosures of the elongated member.

5. The light assembly of claim 4, further comprising a strip having the wire, with the strip extending the length of the continuous opening, with the strip located in the plurality of enclosures and the integral connecting elements and engaging with the elongated base.

6. The light assembly of claim 5, wherein the base is formed of silicone.

7. The light assembly of claim 4, wherein the base is formed of silicone.

* * * * *